No. 741,156. PATENTED OCT. 13, 1903.
G. R. McCOY.
HARNESS.
APPLICATION FILED FEB. 26, 1900.
NO MODEL.
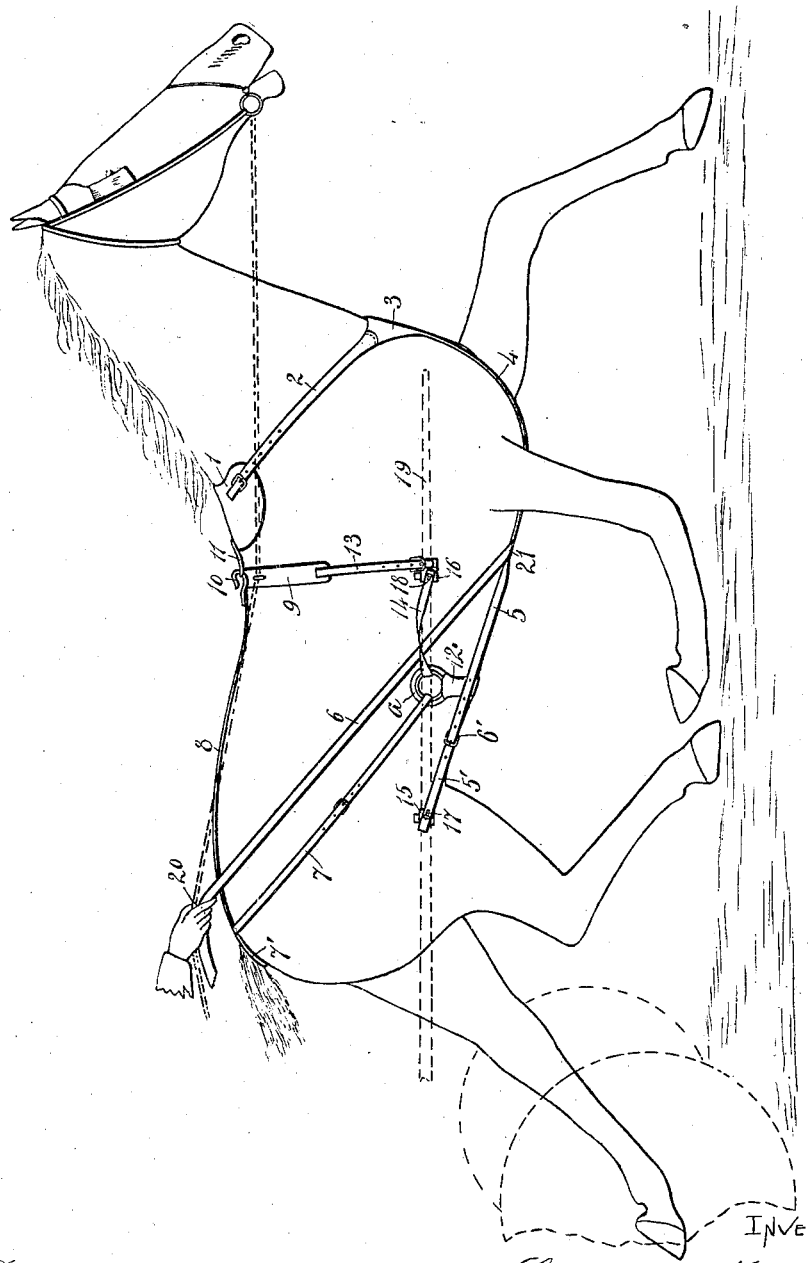
WITNESSES:
C. F. Patterson
Raymond Davenport
INVENTOR
George R. McCoy
PER
Geo. W. Sues
ATTORNEY.

No. 741,156. Patented October 13, 1903.

UNITED STATES PATENT OFFICE.

GEORGE R. McCOY, OF OSCEOLA, NEBRASKA.

HARNESS.

SPECIFICATION forming part of Letters Patent No. 741,156, dated October 13, 1903.

Application filed February 26, 1900. Serial No. 6,622. (No model.)

*To all whom it may concern:*

Be it known that I, GEORGE R. McCOY, residing at Osceola, in the county of Polk and State of Nebraska, have invented certain useful Improvements in Harness; and I do hereby declare that the following is a full, clear, and exact description of the invention, such as will enable others skilled in the art to which it appertains to make and use the same, reference being had to the accompanying drawing, which forms a part of this specification.

The object of my invention is to provide a so-called "speeding-harness" adapted to be used with sulkies and speed-carts and embodying a harness so constructed that the driver is enabled to lift and sustain a portion of the weight of the horse, so that he may sway the horse from side to side, and thus aid the horse in holding himself to increase his speed.

In the accompanying drawing I have shown a side elevation of a speeding-harness embodying my invention.

My invention embodies a withers-pad 1, to which are secured upon opposite sides two ordinary buckles, and extending from this withers-pad 1 is a pad-strap 11. The pad-strap 11 is adapted to engage the terret 10, secured to a gig-saddle 9, from which gig-saddle extends rearward the back-strap 8, to which back-strap is secured the crupper 7'. Depending from the gig-saddle are the two similar thill-straps 13. Extending from the buckles secured to the withers-pad 1 are the two similar neck-straps 2, which in front are united to the breast-yoke 3, and from this breast-yoke 3 extends a martingale-strap 4, passing between the fore legs of the animal, as shown. Extending upward upon each side from the martingale-strap 4 are two similar balancing-straps 6, adapted to be held by the operator. These balancing-straps extend from below the horse's body near the fore legs and encircle the horse upon each side. Extending from the end of the martingale-strap 4 are two counterpart traces 5, which in turn by means of a buckle 6' are adjustably secured to the terminal trace-straps 5', as shown. Secured to these terminal trace-straps 5' are suitable keepers, which may be strapped or otherwise secured to the thills of the cart, as is shown in dotted outline in the drawing.

It might here be stated that the ordinary swinging swingletree is dispensed with, the harness being secured direct to the thills near the rear legs or hips and at the center of the body of the animal, as is shown in the drawing.

In order to support the horse below, I provide the abdominal supporting-strap 12, provided with a ring *a* upon each end, from which ring extends a drag-strap 14, secured to a keeper 16, fixed to the vehicle-shaft, which keeper 16 is also adapted to receive the thill-strap 13. An ordinary button 18 is secured to the keeper 16, so that the drag-strap may be readily disconnected. Extending upward from the ring *a* is a hip-strap 7, united above to the crupper 7'. These two counterpart drag-straps 14 prevent the abdominal supporting-strap 12 sliding backward. From this it will be noticed that there are no straps extending downward from the horse and secured to the vehicle except the thill-straps 13. It will further be noticed that this harness is secured to the thills at two points—first, in alinement with the gig-saddle 9, and, secondly, at the point opposite the hips of the animal.

It is found that in the use of this harness a powerful driver may absolutely control a horse, as he may begin by gently rocking the horse, in lifting the same up by the balancing-straps, and then finally by smartly tugging up one of the straps completely unbalance the horse and throw him upon his side. By means of the balancing-straps a powerful driver is actually enabled to lift the weight and body of the horse momentarily, and then in smartly pulling one of the balancing-straps the horse may be thrown. By this means the forward portion of the horse is supported from below instead of at the bit, as is usual, so that the strain is taken from the horse's mouth and he is practically guided by the movement of the balancing-straps 6. The usual lines, however, are used and are held in the hand with the balancing-straps.

Having thus described my said invention, what I claim as new, and desire to secure by United States Letters Patent, is—

1. A speeding-harness comprising the combination of the following instrumentalities, to wit: a withers-pad, a breast-yoke secured to said withers-pad, a gig-saddle secured to said withers-pad, a back-strap extending from said gig-saddle, a crupper secured to said back-strap, an abdominal supporting-strap, a drag-strap secured to said saddle and said abdominal supporting-strap, hip-straps secured to said crupper and to said abdominal strap, a martingale secured to said breast-yoke and adapted to pass between the animal's fore legs, and balancing-straps extending from said martingale.

2. A speeding-harness comprising the combination with a withers-pad, of a breast-yoke secured to said withers-pad, a gig-saddle secured to said withers-pad, a back-strap extending from said gig-saddle, a crupper secured to said back-strap, an abdominal supporting-strap, a drag-strap secured to said saddle and said abdominal strap, hip-straps secured to said crupper and to said abdominal strap, a martingale secured to said breast-yoke, two balancing-straps extending from said martingale-strap, and trace-straps extending from said martingale-strap, arranged substantially as set forth.

GEORGE R. McCOY.

In presence of—
GEORGE W. SUES,
CLEMENT F. PATTERSON.